US008032427B1

(12) United States Patent (10) Patent No.: US 8,032,427 B1
Spreen et al. (45) Date of Patent: Oct. 4, 2011

(54) SYSTEM FOR PROVIDING LOCALIZED SHOPPING INFORMATION

(75) Inventors: Roger B. Spreen, Los Altos Hills, CA (US); Michael S. Robertson, San Jose, CA (US); Michael J. Van Riper, Santa Clara, CA (US); James J. Ryan, Mountain View, CA (US)

(73) Assignee: Local.com, Irvine, CA (US)

( * ) Notice: Subject to any disclaimer, the term of this patent is extended or adjusted under 35 U.S.C. 154(b) by 1128 days.

(21) Appl. No.: 11/732,598

(22) Filed: Apr. 3, 2007

(51) Int. Cl.
G06Q 30/00 (2006.01)

(52) U.S. Cl. ................. 705/26.9; 705/14.49; 705/14.51; 705/14.54; 705/26.1; 705/26.61; 705/27.1

(58) Field of Classification Search ............... 705/14.49, 705/14.51, 14.54, 26, 27, 26.1, 26.61, 26.9, 705/27.1

See application file for complete search history.

(56) References Cited

U.S. PATENT DOCUMENTS

| | | | | |
|---|---|---|---|---|
| 5,991,739 | A * | 11/1999 | Cupps et al. ..................... 705/26 |
| 6,564,208 | B1 * | 5/2003 | Littlefield et al. .................... 1/1 |
| 6,968,513 | B1 * | 11/2005 | Rinebold et al. .............. 715/854 |
| 7,027,999 | B2 * | 4/2006 | Smith et al. ..................... 705/10 |
| 7,127,261 | B2 * | 10/2006 | Van Erlach ................ 455/456.5 |
| 7,617,246 | B2 * | 11/2009 | Koch et al. ............................ 1/1 |
| 7,743,048 | B2 * | 6/2010 | Baldwin ....................... 707/713 |
| 2001/0001854 | A1 * | 5/2001 | Schena et al. ................... 705/27 |
| 2004/0186769 | A1 * | 9/2004 | Mangold et al. ................ 705/14 |
| 2006/0085392 | A1 * | 4/2006 | Wang et al. ....................... 707/3 |
| 2006/0106778 | A1 * | 5/2006 | Baldwin ............................ 707/3 |
| 2007/0050253 | A1 * | 3/2007 | Biggs et al. ..................... 705/14 |
| 2007/0072591 | A1 * | 3/2007 | McGary et al. ............ 455/414.1 |
| 2010/0297985 | A1 * | 11/2010 | Van Erlach ................ 455/414.1 |

OTHER PUBLICATIONS

Anon., "Unilever to Utilize 'Where-to-Buy' IRI Product Locator™ on Unileverusa.com and Various Brand Web Sites," Business Wire, May 24, 2006.*
"Shop.com—Thousands of Brands. Hundreds of Stores. The Convenience of OneCartTM" [online]. Shop.com, 1997-2007 [retrieved on Apr. 3, 2007]: <URL: www.shop.com>.
"Yahoo! Yellow Pages: Yellow Pages, Maps, Directions, Addresses, Phone Numbers", [online]. Yahoo? Inc. 2007, [retrieved on Apr. 3, 2007]: <URL: yp.yahoo.com>.

* cited by examiner

*Primary Examiner* — Nicholas D Rosen
(74) *Attorney, Agent, or Firm* — Nixon Peabody LLP

(57) ABSTRACT

A localization service is provided that provides users with online information on local retailers that sell particular products. A user can perform a search using a web page associated with the localization service or by searching using an internet search engine. The user's search includes a search origin. The search origin may be defined in terms of location information such as a place name or a postal code. A search for a particular product at local retailers may be made using search parameters such as search origins, product names, model numbers, product categories, and product attributes. The localization service may provide the user with search results in the form of web pages that list which retailers sell the desired product in the vicinity of the search origin. A targeted advertisement server at the localization service may use display criteria to determine which targeted advertisements should be displayed for the user.

20 Claims, 11 Drawing Sheets

SYSTEM FOR PROVIDING LOCALIZED SHOPPING INFORMATION

BACKGROUND

This invention relates generally to computer systems, and more particularly, to systems that assist users in locating products of interest at local retailers.

Web-based shopping comparison services are available that allow users to compare product prices at online retailers. In a typical scenario, a user browses to a shopping comparison service home page and initiates a search for a product of interest. The user can enter a product's model number or more general information such as a desired type of product. The shopping comparison service identifies online retailers that carry suitable products. The user is generally presented with a web page containing a list of prices for the product of interest and a list of associated online retailers at which the product is available. Web pages such as these are often indexed by internet search engines.

Online shopping comparison services are helpful when users are interested in purchasing products online, but do not assist a user who is interested in purchasing a product at a brick and mortar store. The online retailers that are located may not even have brick and mortar establishments, let alone establishments that are in the user's vicinity.

A user who wants to locate a local retailer who sells a product of interest may therefore turn to an online directory service. With an online directory service, a user can locate retailers who sell certain types of products by performing a directory search. For example, a user who is interested in purchasing a particular model of television set can attempt to locate local electronics dealers by performing a search using the search term "electronics." However, online directory services are not able to provide pricing or availability information for particular products.

It would therefore be desirable to be able to provide improved local shopping information online.

SUMMARY

In accordance with the present invention, an online localization service is provided that provides users with information on which local retailers sell particular products.

A user with a web browser may perform a search for a product and location of interest using an internet search engine or using a query engine associated with the localization service. The location of interest, which is sometimes referred to as a search origin, may be defined by a place name (e.g., the user's city), a zip code, or other geographic terms. The product of interest may be defined using product terms such as a product name, a product model number, a product category, etc.

The user may be provided with search results that match the user's search parameters. The search results may include a list of universal resource locators, each of which corresponds to a web page associated with the localization service. When the user clicks on a desired universal resource locator, the universal resource locator and its embedded user search parameters are provided to the localization service.

The localization service has databases. The localization service may extract the search parameters from the universal resource locator when the localization service receives the universal resource locator from the user over the internet. A page generation engine may use information in the databases and the extracted search parameters to dynamically generate a web page for the user. The web page may include a list of which retailers in the vicinity of the search origin carry the product for which the user is searching. Web pages such as these may contain pricing information, information on how far each retailer is from the search origin, product images and other product information, and promotional information.

The localization service may have an advertisement server that applies display criteria such as location-based display criteria to the search parameters that are received from the user. The search parameters and display criteria may be used to determine which targeted advertisements are to be displayed for the user.

Further features of the invention, its nature and various advantages will be more apparent from the accompanying drawings and the following detailed description of the preferred embodiments.

DETAILED DESCRIPTION

The present invention relates to computer-implemented methods for providing users with online information on locally available products. An illustrative system 10 for providing users with localized online product information is shown in FIG. 1.

Figure 1:
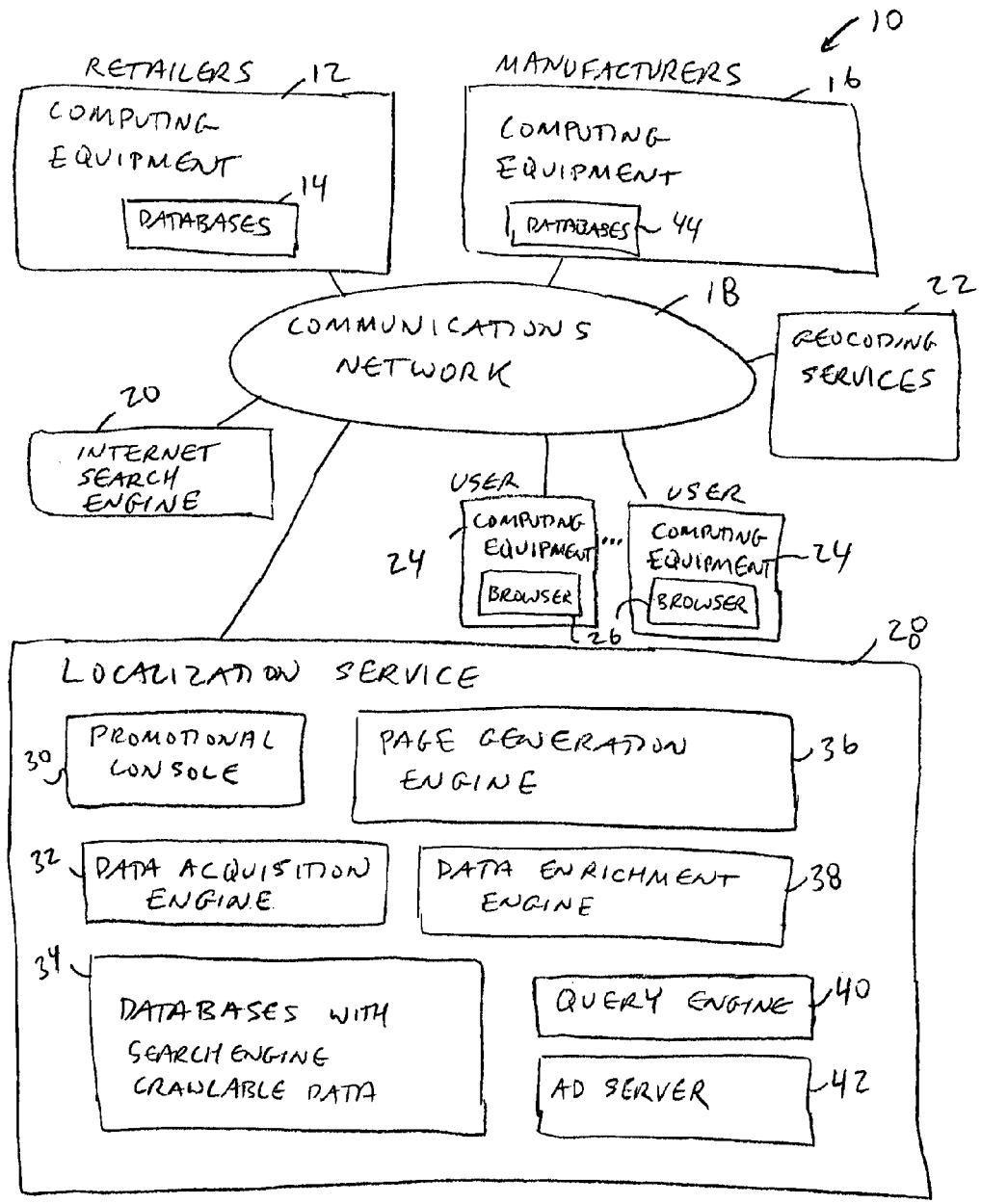
FIG. 1 is a diagram of an illustrative system for a localization service that can be used to provide information on locally available products to interested users in accordance with an embodiment of the present invention.

The entities of FIG. 1 may have associated computing equipment. The computing equipment that is used by the various entities of FIG. 1 may be based on one or more personal computers, workstations, mainframe computers, networks of such computers, or any other suitable computing equipment.

The computing equipment may be interconnected by communications network 18. Network 18 may include local area networks, wide area networks such as the internet, or any other suitable communications networks.

Brick and mortar retailers 12 (companies with physical stores) have physical stores in which they offer products for sale. Customers may visit the physical stores of retailers 12 and may browse for merchandise. Retailers 12 may also have an online presence, but the present discussion will generally focus on the brick and mortar aspects (physical presence aspects) of each retailer's business.

The products that retailers 12 offer for sale are generally manufactured by manufacturers 16. Manufacturers 16 include companies that fabricate products from raw materials, companies that assemble products from the parts made by other companies, subsidiaries of larger companies (e.g., subsidiaries that are associated with different brand names), etc.

Users 24 have software on their computing equipment such as web browsers 26. Web browsers 26 may be used to access web pages from services such as internet search engine 20 and localization service 28 over communications network 18.

Localization service 28 may have one or more databases 34 that may be used to dynamically generate web pages for users 24 with web browsers 26. The information that is stored in databases 34 may be made accessible to search engines such as search engine 20. This allows search engine web crawlers to examine and index the content stored in databases 34. One way to ensure that the web pages of localization service 28 are crawlable by search engine web crawlers is to embed crawlable links in the web pages. By ensuring that most or all of the dynamically generated web pages from databases 34 are linked to each other with crawlable hypertext markup language (HTML) links, the content of databases 34 may be made available to users who perform searches using internet search engines such as internet search engine 20.

The content of databases 34 may also be made available to users 24 over communications network 18 using page generation engine 36.

The information in database 34 may be obtained from retailers 12, manufactures 16, geocoding sources 22, and other suitable sources. This information may be acquired by localization service 28 over communications network 18 using data acquisition engine 32. For example, data acquisition engine 32 may access information that has been stored in databases 14 by retailers 12 and information that has been stored in databases 44 by manufacturers 16. Entities such as retailers 12 and manufacturers 16 may also push information to localization service 28. For example, a retailer or manufacturer may store information in databases 34 using promotional console 30. With one suitable arrangement, promotional console 30 may be provided in the form of a web-based interface. A retailer or manufacturer can log into the promotional console 30 to upload information such as lists of retail stores, store addresses, store hours, store coupons and other promotions, manufacturer coupons and other promotions, product information such as product features, product specifications, product images, product manuals, etc.

Data enrichment engine 38 may process the data that has been acquired using data acquisition engine 32 (and, if desired, the data that has been provided using promotional console 30). For example, data enrichment engine 38 may consult one or more geocoding services 22 when processing data 34. Geocoding services 22 may be used to identify a particular geocode (e.g., a longitude and latitude) corresponding to a retail location. By consulting multiple services such as services 22, data enrichment engine 38 can eliminate redundant information such as duplicate store locations and can otherwise improve data accuracy.

Localization service 28 may act as a web server for users 24 who are browsing the internet with web browsers 26. Because the content of database 34 is preferably indexed by internet search engines, a user who performs a web search using an internet search engine will generally be provided with search results in the form of a list of web pages that contain local product information from database 34. In a typical scenario, a user might type in a search such as "Sony KDL-46XBR3 Television San Francisco" in an attempt to locate information on retailers selling a particular model of television in the vicinity of San Francisco. The web pages that the search engine identifies in its search results correspond to web pages generated by page generation engine 36 based on information in databases 34.

Localization service 28 can also serve as a web server that makes a home page available to users 24. The home page (or other suitable web site page) may contain an option that allows a user to create or edit a customized search origin. The search origin typically corresponds to the geographic location of the user's home or business or to an area in which the user might want to shop. In a typical scenario, a user might click on a link entitled "change location." When the user clicks on the change location option, service 28 may provide the user with an opportunity to enter a desired search origin. The search origin may be supplied in the form of a place name (e.g., San Francisco) or may be provided using other techniques (e.g., using a zip code).

The home page may also contain a search box into which a user can enter a product name or category. As an example, a user may type the name of a particular television model into the search box. Once the user has supplied a search origin and has typed other search parameters into the box provided by localization service 28, the user may click on a search button. In response, the user's browser 26 may supply localization service 28 with the search parameters over communications network 18.

Query engine 40 may be used to perform a database search on databases 34 using the search parameters. The results of searching database 34 for local product availability may be provided to users 24 in the form of web pages. If desired, promotional information may be provided on the web pages. With one suitable arrangement, some or all of the search terms that are used in searching databases 34 may be used in targeting advertisements for the user. The targeted advertisements may be provided by advertisement server 42.

Using localization service 28, users can obtain accurate information on which local retailers carry a particular product. The web pages that localization service 28 provides to the users also contain pertinent information such as product prices, store locations, the distance between the search origin and each retailer, the lowest price available at any store within a particular distance from the search origin, special sales or other promotions that are available, etc. Any suitable web page format may be used to present search results to a user.

With one suitable arrangement, which is described as an example, localization service 28 and page generation engine 36 may provide at least three types of web pages: product detail pages, product category pages, and store detail pages. These are merely illustrative web pages that the system of FIG. 1 may provide to a user. Any suitable web page format may be used to present the information from databases 34 to users 24 if desired. Moreover, the use of web pages and web browsers 26 as the delivery mechanism for this information is presented as an example. Customized server and client software that does not use web browsers may be used in place of web browsers. An advantage of using web browsers 26 and web pages as the format for delivering information from databases 34 to users 24 is that web browsers are widely available.

When a user performs a search for a desired product using internet search engine 20 or query engine 40 of localization service 28, the user is provided with search results. An internet search engine typically provides results in the form of a web page containing a list of universal resource locators (URLs) corresponding to web pages of localization service 28. A user can click on one of the listed URLs (also called links) to obtain access to the desired web page.

When a user provides search parameters to localization service 28 (e.g., by typing desired search terms into a search box on a web page associated with localization service 28), localization service 28 may use query engine 40 to perform a search on databases 34.

If localization service 28 detects that a user's search has resulted in a particularly close match (i.e., where there is only one retailer that sells a given product in the user's vicinity), localization service 28 can automatically present a user with a web page containing details on the matching retailer. In this situation the search results may be presented as a single web page.

If multiple retailers match the user's search parameters, the localization service may provide a web page containing a list of the matching retailers. The matching retailers may be listed in any suitable order. For example, the retailers may be listed in order of their distance from the search origin, in order of their price for a desired product, etc. Localization service 28 may charge a fee to particular retailers in return for preferential treatment in the list (e.g., highlighting or listing at the top of the list in a sponsored results region).

Figure 2:
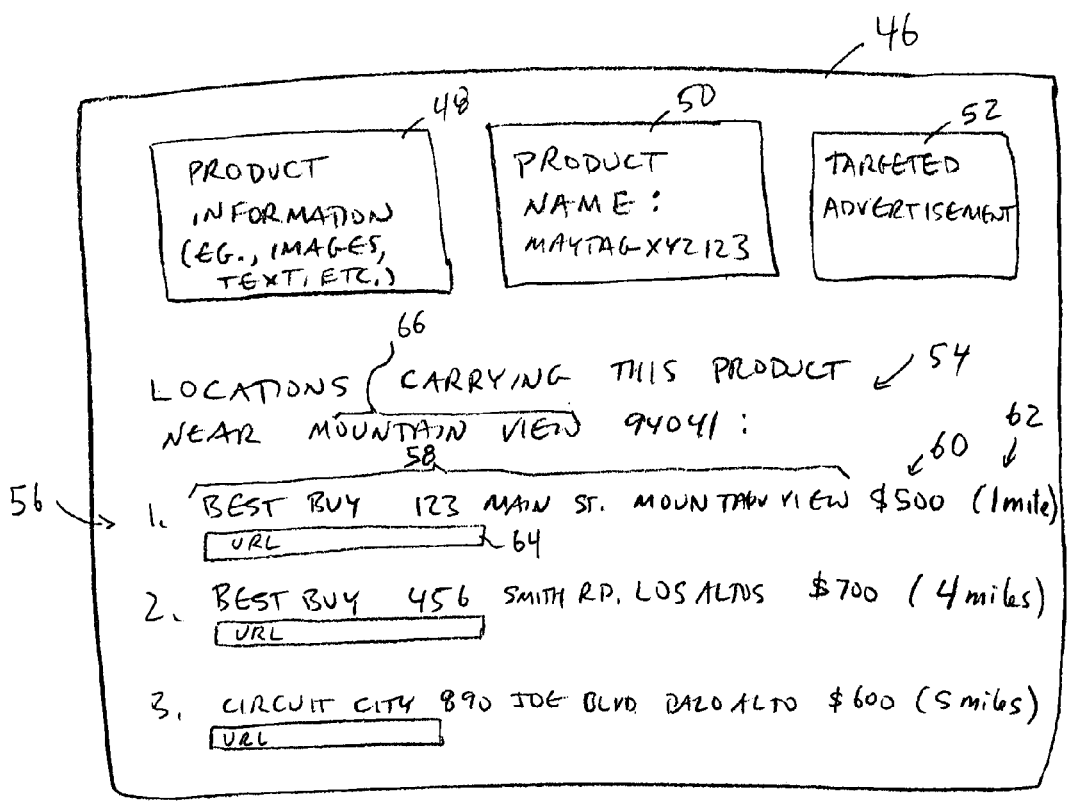
FIGS. 2, 3 and 4 show illustrative product detail pages that may be displayed to a user by a localization service in accordance with an embodiment of the present invention.

An illustrative product detail page that may be provided to a user in response to a search for local retailers carrying a desired product is shown in FIG. 2. As shown in FIG. 2, product detail screen 46 may include a product name 50. The product name may include a model number, a brand, and other identifying information. Page 46 may also include other product information 48 such as one or more product images, video clips of a product, links to product manuals, specifications, features, product descriptions, product reviews, etc. Promotional information such as one or more targeted advertisements may be displayed if desired. A targeted advertisement such as targeted advertisement 52 may include text, graphics, images, audio, and video (e.g., video including audio) or any suitable combination of such media. The media content for targeted advertisement 52 may be provided to a user over communications network 18 using advertisement server 42 (FIG. 1).

In the example of FIG. 2, a user has performed a search for the product "Maytag XYZ123." One or more retailers that carry this product may be listed in list 56. Descriptive heading 54 informs the user that the retailers in the list have matched the user's search parameters. Heading 54 may include information on the search origin 66 that is being used (e.g., "Mountain View").

Each entry in list 56 may include a retailer name and address 58, a product price 60, and a distance 62. The name and address of each retailer may include contact information such as telephone numbers, email addresses, and web site addresses. The price 60 that is listed next to the retailer's name and address corresponds the unique price at which that particular retail store is offering the "Maytag XYZ123" product. The distance 62 that is presented to the user corresponds to the distance between that retail store and the user's search origin.

In the example of FIG. 2, the entries in list 56 have been organized according to the distance of each retailer from the user's search origin. This is merely illustrative. The search results on page 46 may be organized according to any suitable criteria. For example, the retailers may be listed alphabetically, randomly, based on descending price, based on ascending price, based on whether the product is currently in stock, etc. The user may be provided with clickable options that allow the user to reorder the search results. For example, a user may initially be presented with a page in which retailers are listed according to their distance from the user's search origin. If a user clicks on a "list by price" option, the list may be reordered so that the retailers are listed according to descending price for the desired product.

The number of entries in list 56 may be limited by a given search radius or other geographic limitation. The search radius may be 25 miles by default (or other suitable distance) and may be modified by the user. Information such as a user's search origin, desired search radius, and other personal information may be stored on localization service 28 (e.g., under a user account) or may be maintained locally on user computing equipment 24 (e.g., using cookies—small amounts of data that a user's browser can submit to a web server and that the web server can use to maintain specific information about the user).

Each entry in list 56 may have an associated clickable link (URL) 64. Once a user has decided which of the listed retailers is of interest, the user can click on the link 64 that is associated with that retailer to obtain more detailed information. With one suitable arrangement, the page generation engine 36 presents the user with a store detail page corresponding to the selected link.

The contents of list 56 depend on the search parameters that are used. In the example of FIG. 2, a search was performed for product "Maytag XYZ123" with a search origin of Mountain View 94041. Either the place name "Mountain View, Calif." or the zip code "94041" may be used to define the search origin. The resulting list 56 includes retailers that carry the desired product ("Maytag XYZ123") and that are in the vicinity of Mountain View, Calif.

Figure 3:
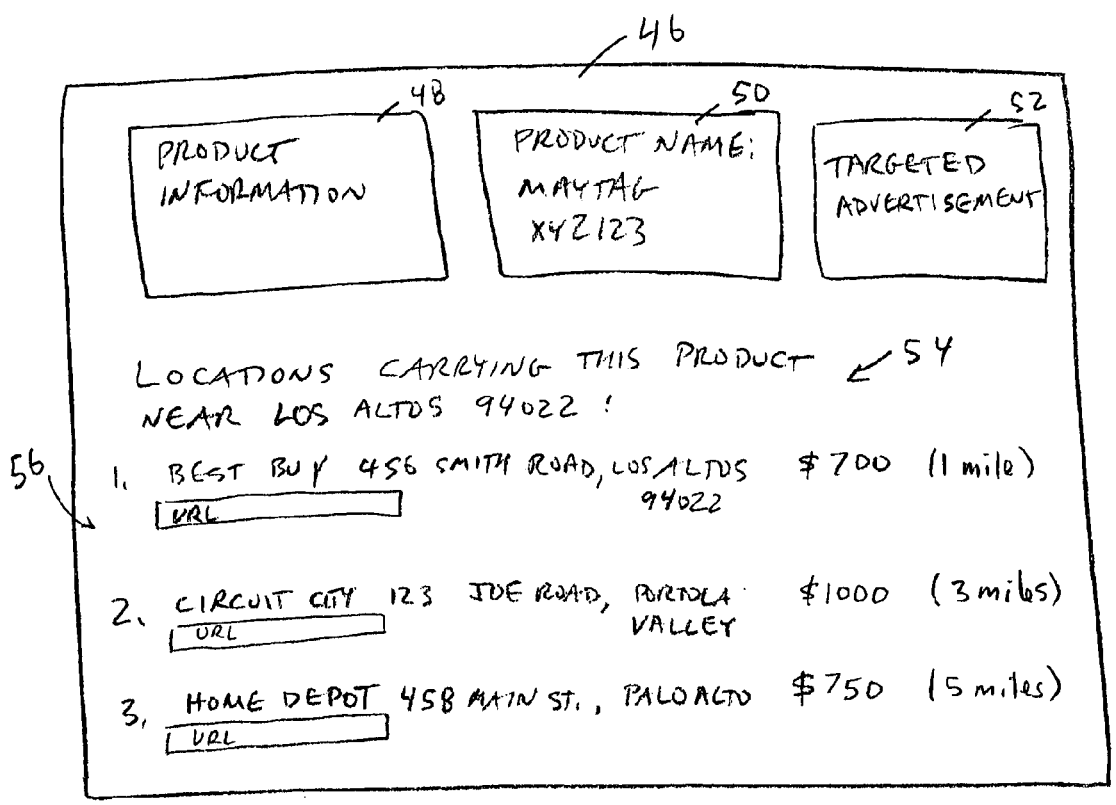

As shown in FIG. 3, if a different search origin is used when searching for the same product, the contents of list 56 will change accordingly. In the FIG. 3 example, a search origin of Los Altos, Calif. has been used in place of the search origin of Mountain View Calif. that was used in the FIG. 2 example. List 56 still includes retail stores that carry the Maytag XYZ123 product, but because the search origin is different, the list of stores has been updated to include stores that are in the vicinity of Los Altos rather than stores that are in the vicinity of Mountain View. There may be overlap between lists such as list 56 of FIG. 2 and list 56 of FIG. 3 when nearby search origins are used. If search origins are used that are relatively far apart, there may not be any overlap in the search results that are presented.

Figure 4:
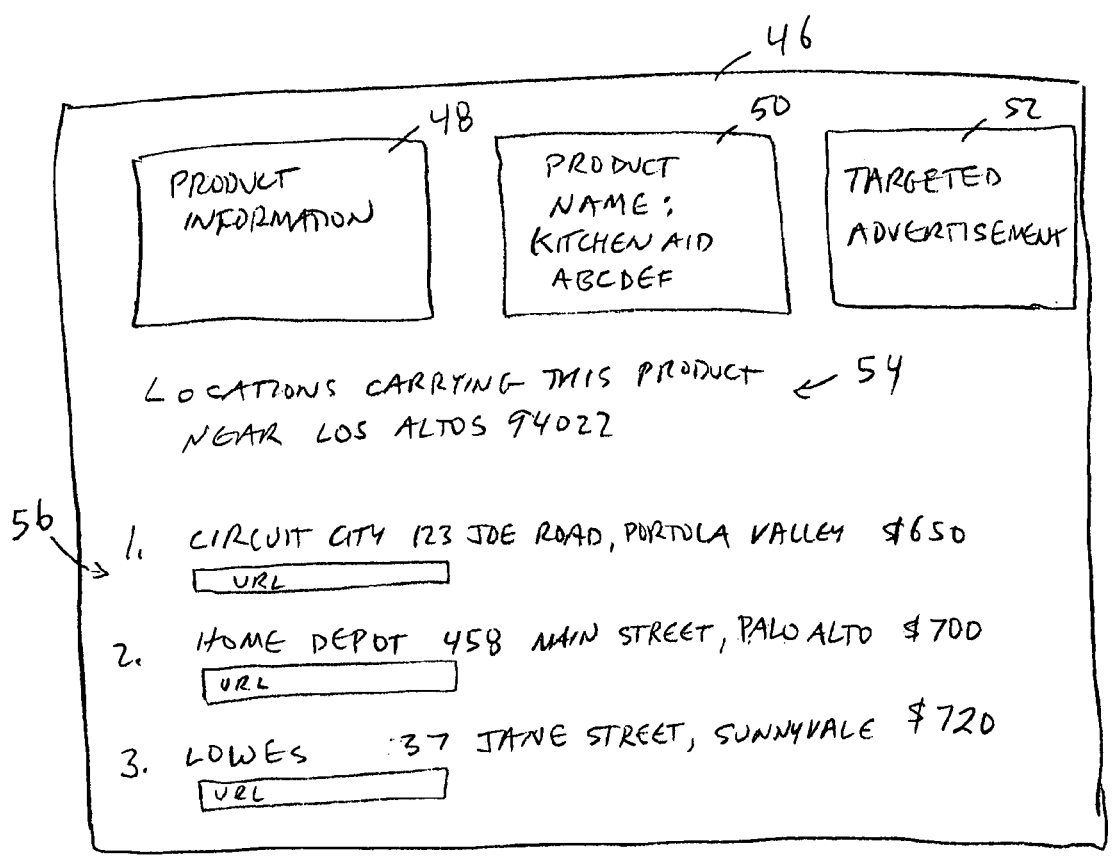

Another example is shown in FIG. 4. In the FIG. 4 example, the search origin has not been changed relative to the example of FIG. 3, but the product description has been changed. In the FIG. 3 example, the user searched for the product "Maytag XYZ123," whereas in the FIG. 4 example, the user has searched for the product "Kitchen Aid ABCDEF." As a result, list 56 in FIG. 4 includes those retailers near the user's search origin that sell the product "Kitchen Aid ABCDEF." There may be overlap between list 56 of FIG. 3 and list 56 in FIG. 4 because many retailers may carry both the brand "Maytag" and the brand "Kitchen Aid."

Any suitable URL formatting scheme may be used to construct URLs for pages such as the product description pages of FIGS. 2, 3, and 4. With one suitable arrangement, which is described as an example, each product description page URL contains a set of associated search parameters. For example, the URL for page 46 of FIG. 2 might be http://www.krillion.com/XRPC_Maytag_XYZ123_MountainView_CA_9 4041. The first portion of the URL http://www.krillion.com/ corresponds to the domain name for the localization service 28.

The term XRPC is a code that is used for disambiguation. A variety of such codes may be used by service 28. Use of disambiguation codes in the URLs for the web pages of service 28 helps to avoid situations in which two web pages that should be different inadvertently share the same URL. This might occur, as an example, when a product name and a place name are the same. The disambiguation code avoids confusion by labeling each URL term (e.g., the letter "P" in the disambiguation code might indicate that a corresponding term in the URL is a place name).

Following the disambiguation code, the URL contains URL parameters such as "Maytag" (a brand name), "XYZ123" (a model number), Mountain View (a city name), CA (a state name), and 94041 (a zip code). These are examples of the types of parameters that a user may supply to search engine 20 or query engine 40 (FIG. 1) when attempting to locate a product of interest. Parameters such as these are sometimes referred to as search terms or search parameters. Suitable URL parameters may include general and specific product categories (e.g., appliances or refrigerators), product attributes (e.g., electric, manual, LCD, plasma, etc.).

The URL for the illustrative product detail page of FIG. 3 might be http colon slash slash www dot krillion/ XRPC_Maytag_XYZ123_LosAltos_CA_94022. The URL for the illustrative product detail page of FIG. 4 might be http colon slash slash www dot krillion.com/XRPC_ KitchenAid_ABCDEF_LosAltos_CA_94022.

In the examples of FIGS. 2, 3, and 4, product detail web pages 46 were described. Product detail web pages may be provided to users who are searching for a particular model of product. Sometimes, however, a user performs a search using more general search terms. For example, a user may perform a search for "refrigerators." In this type of situation, it is not necessarily desirable to display retailer information that is limited to a particular refrigerator model. Rather, it may be desirable to display information for a range of different refrigerators.

Figure 5:
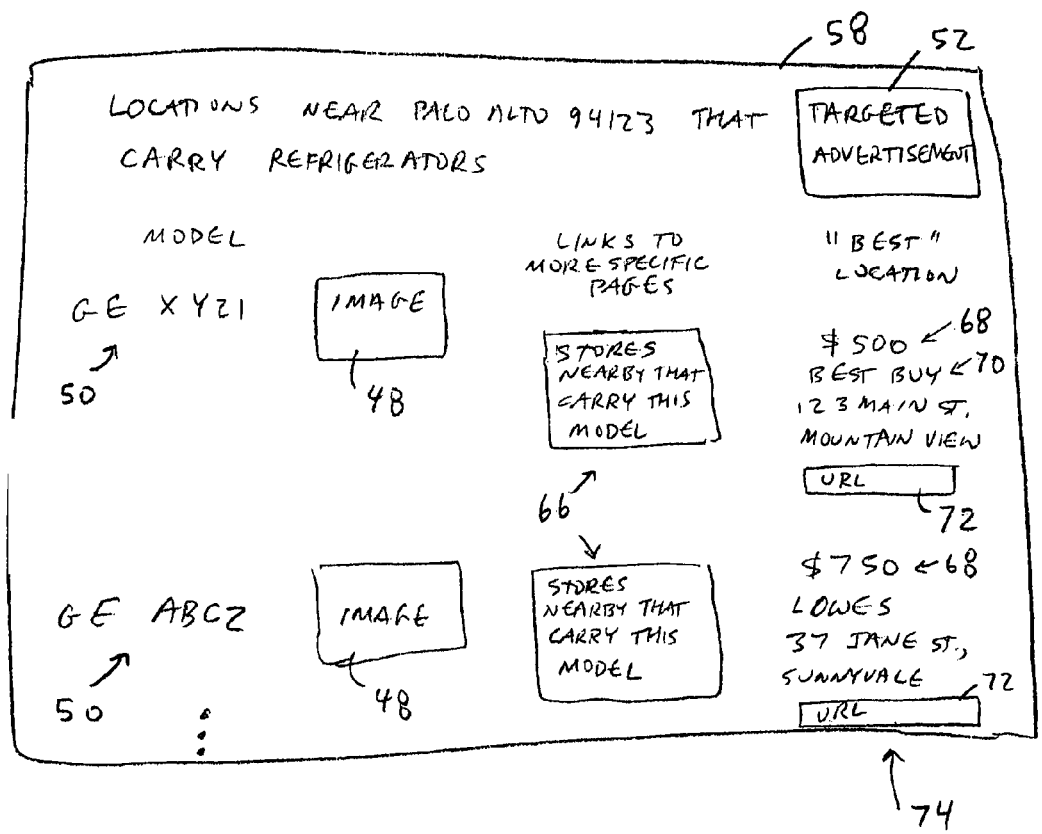
FIG. 5 shows an illustrative product category page that may be displayed for a user by a localization service in accordance with an embodiment of the present invention.

One way in which search results information that is applicable to multiple products may be presented to a user is with a product category page of the type shown in FIG. 5. As shown in FIG. 5, product category page 58 may contain entries that correspond to multiple products. In the example of FIG. 5, the first row of search results corresponds to an entry for a refrigerator model "GE XYZ1", whereas the second row of the search results corresponds to an entry for a refrigerator model "GE ABCZ." There are only two entries in the page shown in FIG. 5, but in general there may be any suitable number of entries.

Each entry may include associated product information 48 and links 66 to nearby stores that carry the model in that entry. Product category web pages such as web page 58 may include one or more columns of pricing information such as column 74. Column 74 may list the lowest price 68 for the product in each row. This serves as a summary for the user, who may not want to separately browse to each of links 66. The name and address of the retailer that is selling the lowest price product may also be provided in column 74, as indicated by name and address 70. A clickable retailer link 72 may be provided adjacent to each retailer name and address. A user who is interested in obtaining more information about a particular store may click on an appropriate one of links 72.

When a user has identified a retailer of interest (e.g., from a product detail page such as product detail pages 46 of FIGS. 2, 3, and 4 or from a product category page such as page 58 of FIG. 5), a user may click on a link associated with that retailer. For example, a user may click on link 64 on page 46 of FIG. 2, may click on one of links 66 on page 58 of FIG. 5, or may click on one of links 72 on page 58 of FIG. 5. In response, page generation engine 36 may display a store detail page such as store detail page 76 of FIG. 6.

Figure 6:
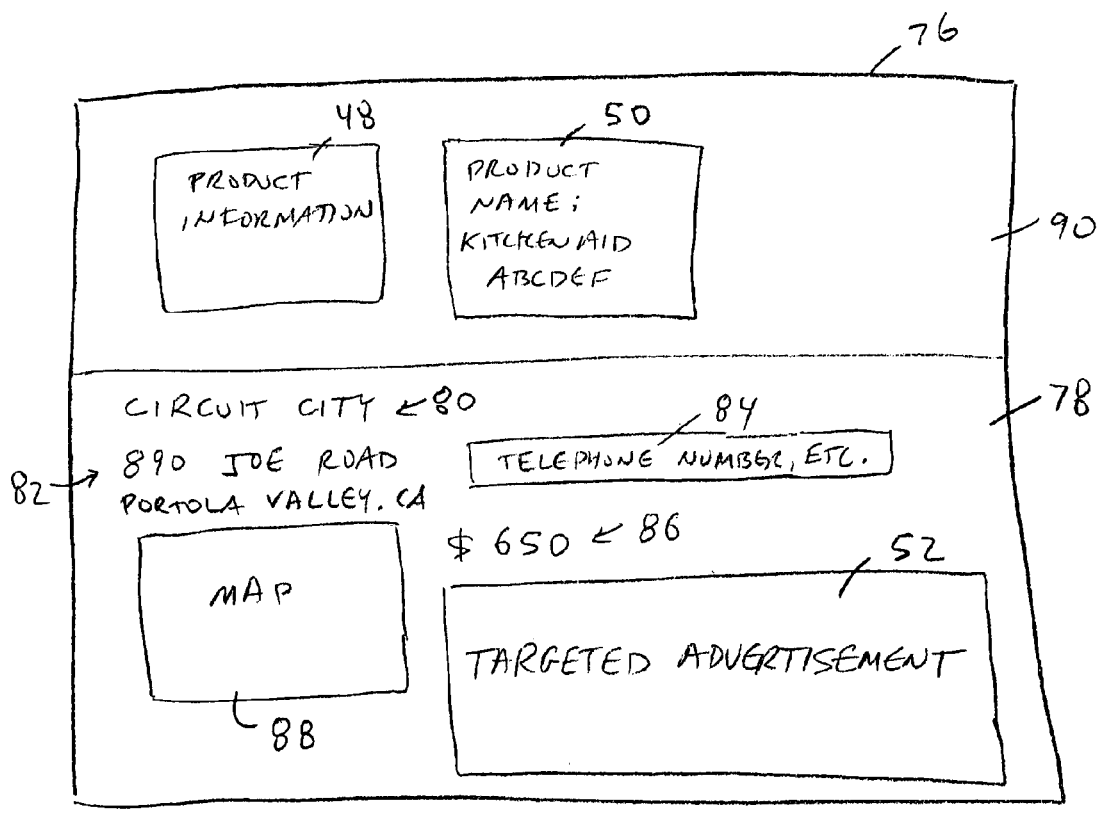
FIG. 6 shows an illustrative store detail page that may be displayed for a user by a localization service in accordance with an embodiment of the present invention.

As shown in FIG. 6, store detail page 76 may include the product name 50 and other product information 48 for the product that the user is interested in purchasing. Store detail page 76 may also contain a region such as region 78 in which detailed information on the selected retailer is presented. Regions such as region 78 may include the retailer's name 80 and address 82. Additional information 84 such as store hours or contact information such as an email addresses, web site addresses, and telephone numbers may also be provided. An interactive map such as map 88 may be included on page 76 to provide the user with detailed location information and driving directions. Map 88 may show the retailer's location and, if desired, a driving route to the retailer from the search origin.

The price for which the retailer offers the product may be displayed as shown by price 86. Because different branches of a given retail company may offer the same product at different prices, the price 86 may not always be the same at different store branches. The price 86 may include promotional pricing that is in effect at the particular store identified by name 80 and address 82. By making local pricing information (including promotional pricing information) available to users online, users are provided with the information they need to make an immediate local purchase decision, without forcing users to hunt for an appropriate retailer in a directory and make follow-up telephone calls to inquire about product pricing and availability.

Targeted promotional information such as targeted advertisement 52 of FIG. 6 may be displayed in region 78 or in region 90. Advertisements such as advertisement 52 may be targeted based on the user's search parameters (e.g., the user's search origin, the user's default or user-selected maximum search radius, the user's desired product name, store name, address, product category, model number, etc.).

Because localization service 28 has a large amount of information on the user's location and interests, advertisements can be narrowly tailored. For example, a company may run an advertisement that is shown only for users who have searched for a competitor's product or only for users whose search origin is within a certain distance of one of their retail outlets or the stores of a competitor. Advertisements may also be targeted based on product categories. For example, if a user searches for refrigerators, an advertisement 52 may be displayed that advertises kitchen appliances, a particular type of refrigerator, redecorating services, etc. Targeted advertisements may be provided to users 24 by localization service 28 using advertising server 42 (FIG. 1).

Figure 7:
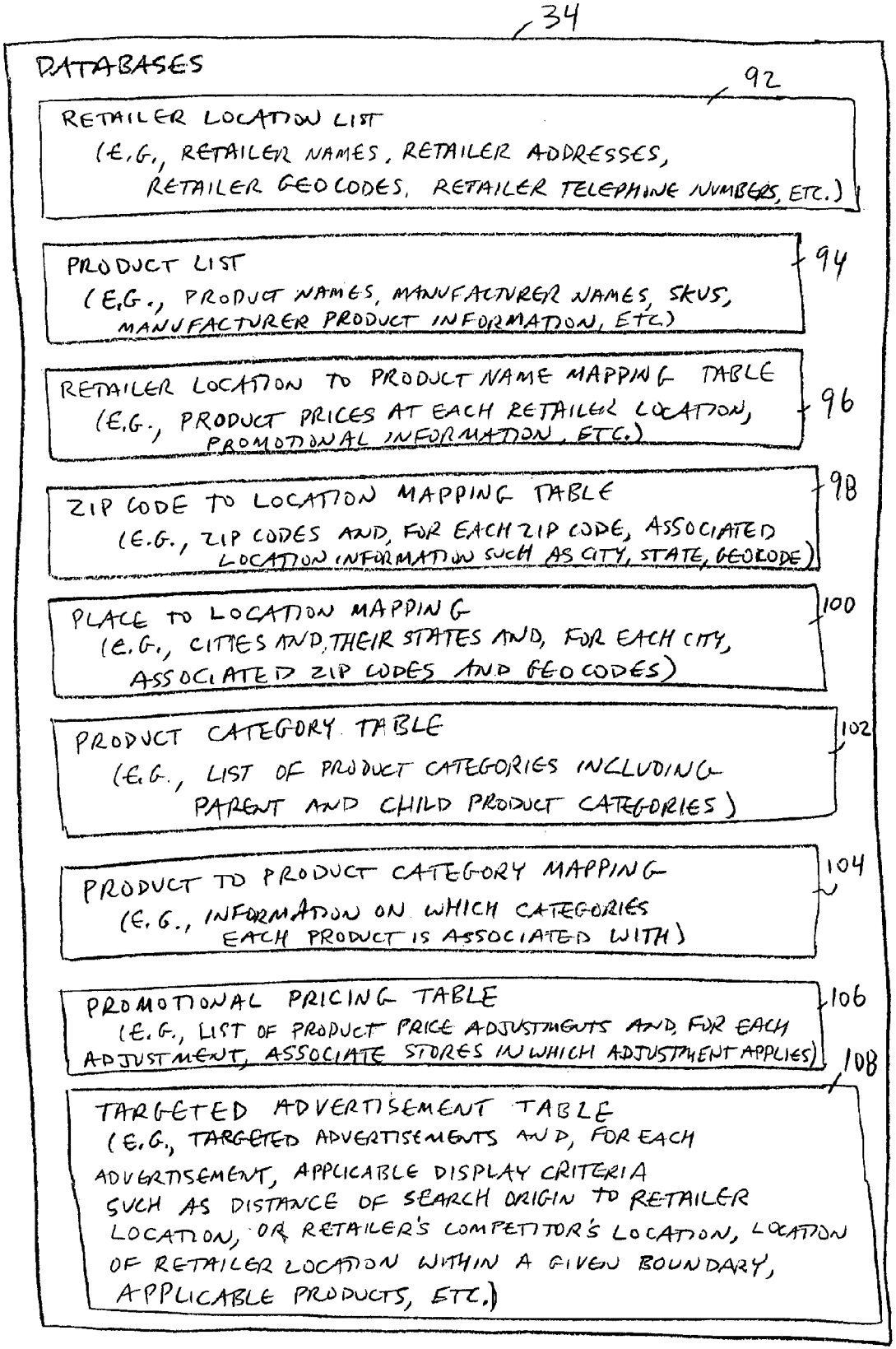
FIG. 7 is a schematic diagram of illustrative databases that may be used by a localization service in accordance with an embodiment of the present invention.

Illustrative databases 34 that localization service 28 may use to provide product and retailer information to users are shown in FIG. 7. As shown in FIG. 7, databases 32 may include a retailer location list 92. Retailer location list may include retailer names, corresponding retailer addresses, corresponding geocodes (e.g., longitudes and latitudes or other information indicating precise geographic locations), and ancillary retailer information such as telephone numbers, web site addresses, contact information for each retailer, etc.

Databases 32 may also include a product list 94. Product list 94 may include a list of products and, for each product associated information such as the name of that product's manufacturer, identifying information for the product such as a model number, a SKU (stock keeping unit), product images, product manuals, product features, product specifications, product descriptions, etc.

Retailer location to product name mapping table 96 may be used to relate databases 92 and 94. For example, if there are N retailers in retailer location list 92 and M products in product list 94, table 96 may contain N*M entries. Each entry in mapping table 96 relates a particular product to a particular retailer that sells the product and has an associated product price at that retailer. The price of the same product will generally be different for different store locations, so the entries in table 96 for a particular product may have different prices. If desired, table 96 may include promotional information. For example, a retailer may append information to a product such as information on applicable installation or design services, promotions, etc.

Zip code to location mapping table 98 may include a list of zip codes (postal codes). For each zip code, table 98 may contain a corresponding set of place names and geocodes. In many situations, there will be a single place name (e.g., a particular city) corresponding to a given zip code. The location of the center of the city may be represented by a geocode. In other situations, one zip code may be associated with multiple cities, each having an associated geographical location represented by a unique geocode.

Place to location mapping 100 may contain a list of place names. The list of place names in this database may include official city names and unofficial city names (e.g., the names of neighborhoods in a large city or the name of a portion of a city). For each place name in mapping 100, mapping 100 may include one or more corresponding zip codes and geocodes. As an example, a large city may have multiple zip codes.

Databases 34 may include a product category table such as product category table 102. Product category table 102 may relate categories to associated more specific product categories (child categories) and less specific categories (parent categories). For example, the category televisions may be related to parent category electronics and child categories LCD televisions and plasma televisions.

Product to category mapping 104 may include information on which categories each product is associated with. For example, a particular model of refrigerator could be related to the product category "refrigerator."

Some retailers may want to offer promotional pricing. For example, a retailer might offer $20 off all products costing $200 or more, a retailer might offer 5% off all products, or a retailer might offer a particular discount (e.g., $200) on a particular product. Information on applicable promotional pricing schemes such as these may be stored in promotional pricing table 106.

Targeted advertisements may be stored in targeted advertisement table 108. This table, which may be accessed by or stored in ad server 42 of FIG. 1, may be used to provide users with targeted advertisements such as targeted advertisements 52 of FIGS. 2-6. Table 108 may include targeted advertisements and, for each advertisement, associated criteria to be applied by localization service 28 (i.e., targeted advertisement server 42) when determining which targeted advertisements should be displayed for a user. Typical display criteria may include rules such as "do not display on Saturdays" or "display whenever a particular retailer is listed on web page."

More complex display rules may also be used. For example, an advertisement may be displayed whenever a sponsor's store is listed on a web page or whenever a sponsor's competitor's store is listed. Information such as the location of the search origin or other geographic boundary information may be taken into account when displaying advertisements. For example, a store may desire to display an advertisement whenever a user's search generates a match for the store that is less than 5 miles away from the user's search origin. In general, any suitable combination of search parameters (e.g., search origin, model name, product category, search location, search place name, search zip code, etc.) may be used when applying the display criteria associated with a particular advertisement. The foregoing examples are merely illustrative.

Figure 8:
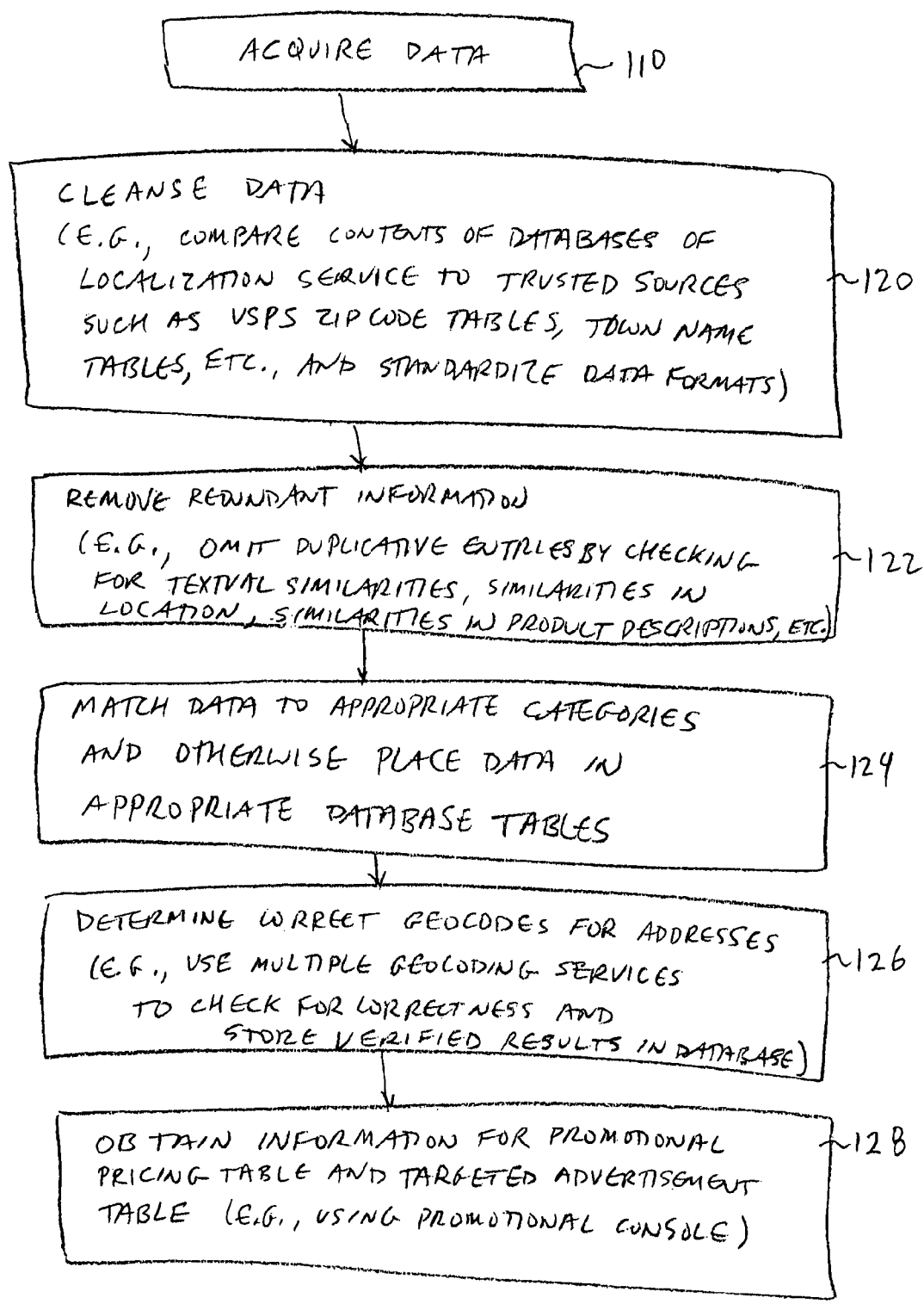
FIG. 8 is a flow chart of illustrative steps involved in establishing and maintaining databases for a localization service in a system of the type shown in FIG. 1 in accordance with an embodiment of the present invention.

Illustrative steps involved in creating and maintaining databases 34 are shown in FIG. 8. At step 110, data for databases 34 may be acquired. For example, data acquisition engine 32 may extract information for databases 34 from web sites on the internet and may otherwise obtain electronically available database information. If desired, data acquisition engine 32 may electronically contact databases 14 and 44 to extract information for databases 34. Information may also be stored in databases 34 by retailers 12 and manufacturers 16.

During steps 120, 122, 124, and 126, data enrichment engine 38 (FIG. 1) performs data enrichment operations on the data that has been acquired. Data enrichment may be performed using internally available data (e.g., by cross-checking data in databases 32 to determine whether it is self-consistent) and using externally available data (e.g., geocoding data from external sources such as geocoding data from internet geocoding services 22).

At step 120, data enrichment engine 38 cleanses the acquired data. During the operations of step 120, data enrichment engine 38 may compare database data to one or more alternative trusted sources. As an example, data enrichment engine 38 may compare zip codes that have been acquired to a trusted source of zip code data such as a zip code database from the United States Postal Service. As another example, city names may be compared to a trusted directory of city names. Address formats may be standardized. For example, streets may be named with a standardized naming convention.

At step 122, data enrichment engine 38 may remove redundant information from the acquired data. For example, data enrichment engine 38 may compare entries in databases 34 to each other to identify duplicate entries. If two entries are found to be duplicative (e.g., because two retailer entries are located at the same address, because two products have the same model number, etc.), the extra entries may be deleted from databases 34.

At step 124, data enrichment engine 38 may place the acquired data into the tables and other data structures shown in FIG. 7. For example, products can be categorized and associated with appropriate product category names.

At step 126, data enrichment engine 38 may correct erroneous location data in database 34. For example, data enrichment engine 38 may check whether a geocode for an address of a retailer is correct by consulting multiple geocoding databases such as geocoding databases associated with geocoding services 22 (FIG. 1). By mapping addresses to multiple geocodes (e.g., longitudes and latitudes) and comparing the resulting geocodes, data enrichment engine 38 can ensure that the retailer location geocodes in database 34 are accurate.

After enriching the acquired data during the operations of steps 120, 122, 124, and 126, localization service 28 may obtain information for promotional pricing table 106 and targeted advertisement table 128. Promotional pricing and targeted advertisement information may be obtained automatically over communications network 18 (e.g., using a data acquisition tool such as data acquisition engine 32 to extract information from databases 14 and 44).

Retailers 12 and manufacturers 16 may also provide promotional pricing and targeted advertisement information to localization service 28 over network 18. For example, retailers 12 and manufacturers 16 may store information in databases 34 over communications network 18 using promotional console 30. Retailers 12 and manufactures 16 may also provide promotional pricing information and targeted advertisement content to localization service 28 using other techniques (email, mailed media, fax, etc.)

Page generation engine 36 dynamically generates web pages based on the content of databases 34. Localization service 28 may also supply static web pages. The static and dynamic web pages of localization service 28 preferably contain crawlable HTML links so that the content of databases 34 may be indexed by internet search engines such a internet search engine 20. Indexing the content of databases 34 allows users to locate web pages such as the product detail web pages of FIGS. 2, 3, and 4, the product category page of FIG. 5, and the store detail page of FIG. 6 as part of an internet search for a desired product and retailer. Users can also access the contents of databases 34 by performing a search using the query engine 40 that is associated with localization service 28.

Figure 9:
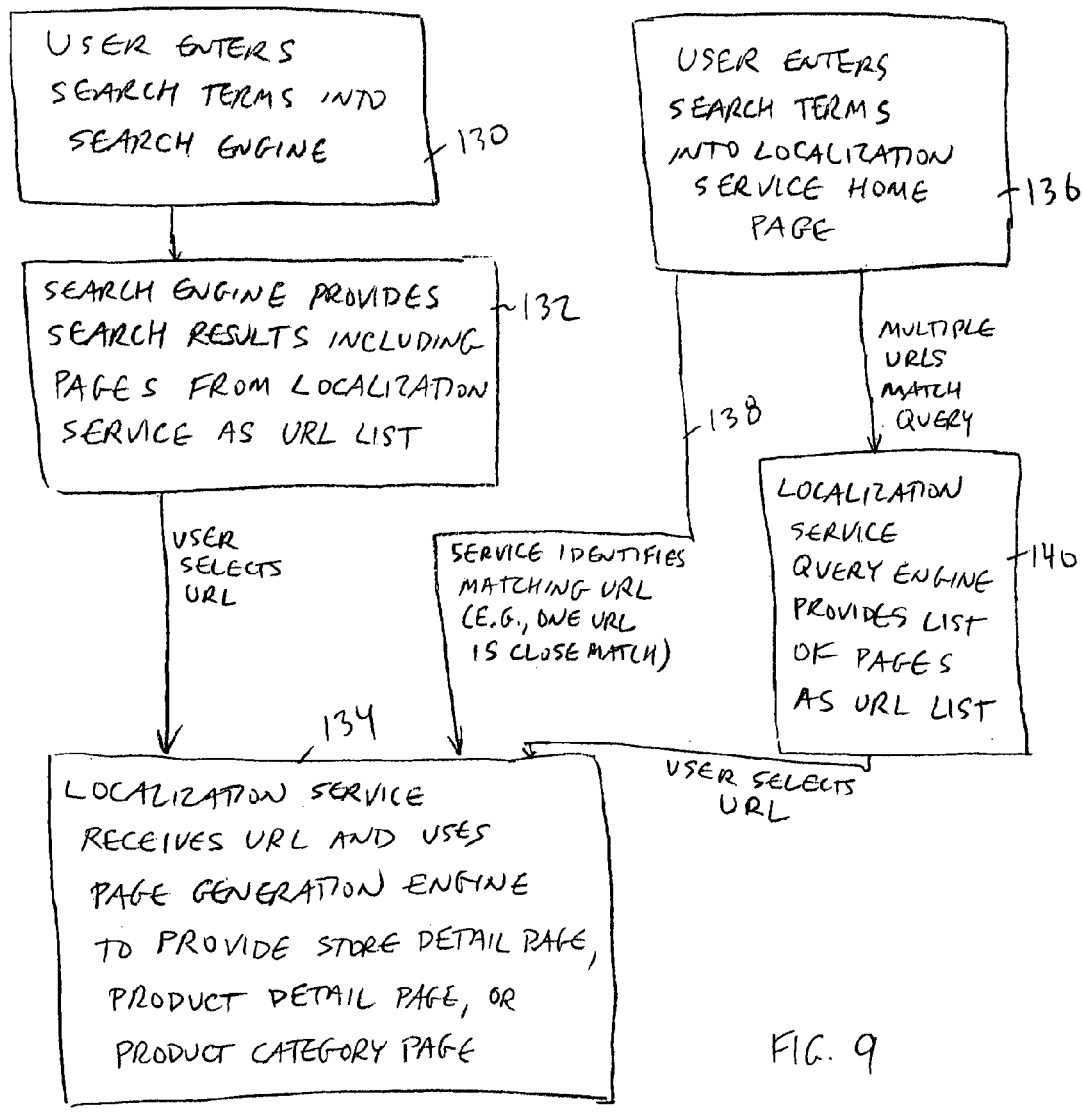
FIG. 9 is a flow chart of illustrative steps involved in using a localization service to provide users with information on locally available products in accordance with an embodiment of the present invention.

Illustrative steps involved in locating and obtaining localization service web pages of interest using a system of the type shown in FIG. 1 are shown in FIG. 9.

As shown in FIG. 9, a user may perform a web search using search engine 20 (step 130). For example, a user may perform an internet search using the terms "Maytag," "XYZ123," and "Mountain View" in an attempt to locate retailers that sell a particular Maytag refrigerator.

In response, search engine 20 performs an internet search and provides the user with search results. The search results may be provided to the user in the form of a web page containing a list of URLs. The URLs may include URLs corresponding to pages such as the web page of FIG. 2.

When a user selects a desired one of the search results entries by clicking on one of the URLs, the localization service 28 receives the URL and provides a corresponding web page to the user (step 134). Page generation engine 36 may be used to dynamically create web pages based on the content in databases 34. The pages may include product detail pages, store detail pages, and product category page, as described in connection with FIGS. 2-6.

If desired, a user can access the web pages of localization service 28 by browsing to a home page or other web page of localization service 28 that contains a search box. The home page may also contain options such as a search origin option that allow the user to supply search parameter settings such as a preferred search origin, a preferred search radius, etc. At step 136, the user may enter search parameters and initiate a search of this type. In response, query engine 40 queries databases 34 to locate corresponding search results. If localization service 28 identifies a particularly close match to the user's search parameters (e.g., when only a single web page matches the search) the localization service may automatically present the user with the appropriate web page, as indicated by line 138. If localization service 28 produces a list of matching URLs, the list may be provided to the user at step 140. The user may then click on a desired URL. In response, localization service 28 provides the user with a corresponding web page at step 134.

Figure 10:
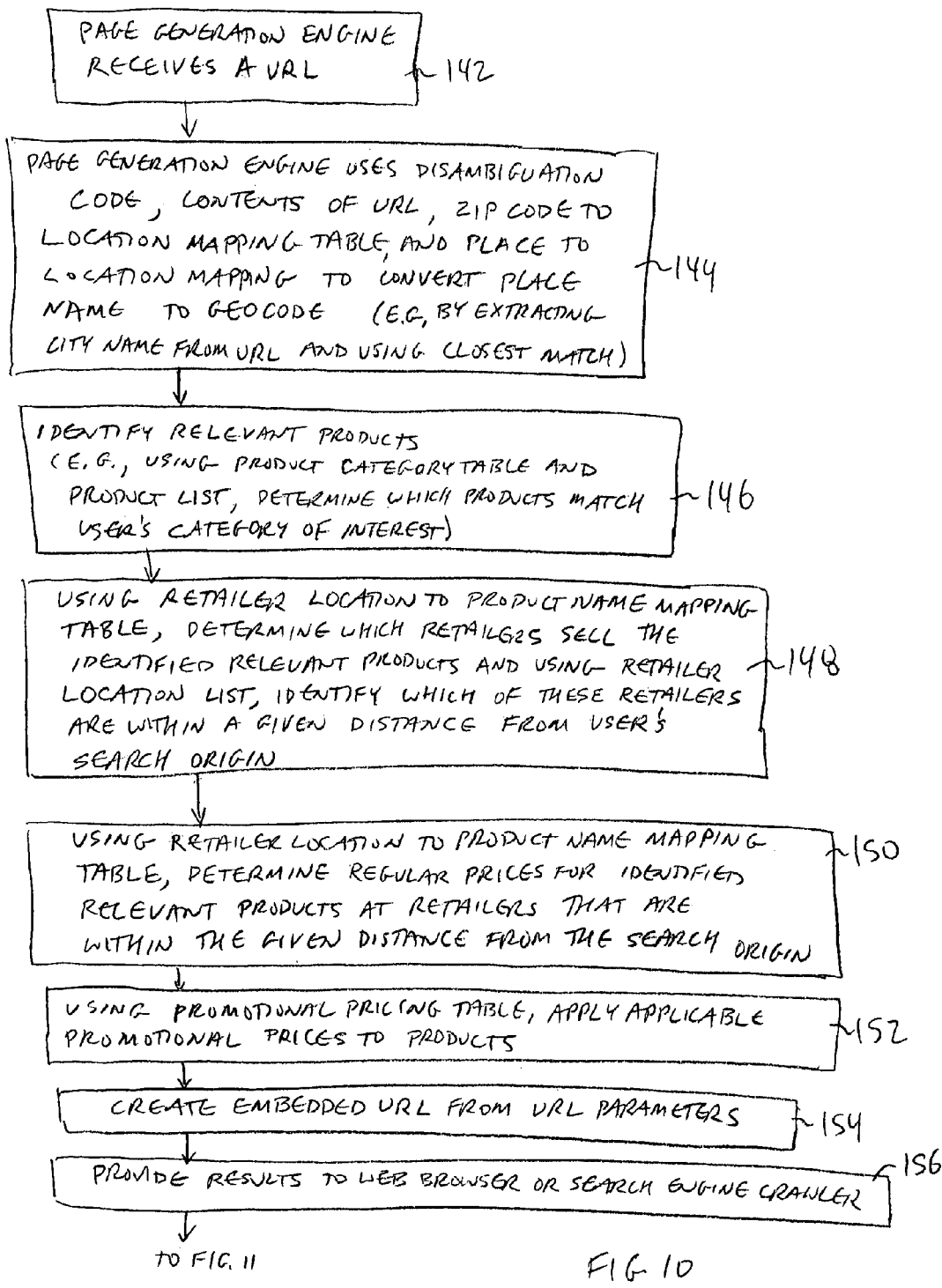
FIGS. 10 and 11 contain a flow chart of illustrative steps involved in using a page generation engine to provide a user with pages such as a store detail page, product detail page, and product category page in accordance with an embodiment of the present invention.
Figure 11:
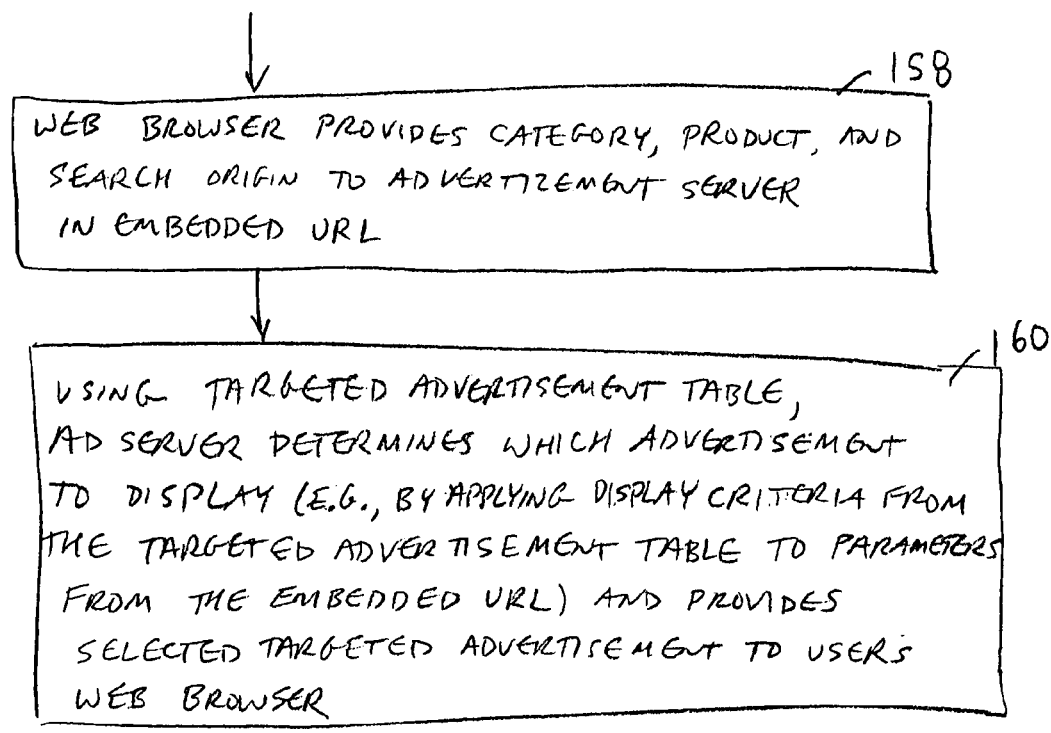

Illustrative steps involved generating the web page at step 134 are shown in the flow chart of FIGS. 10 and 11.

At step 142, page generation engine 36 receives a URL from the web browser 26 of a user 24 over communications network 18. The URL includes search parameters such as a desired search origin, product names and/or product categories, etc. As described in connection with the examples of FIGS. 2, 3, and 4, the URL may also contain a disambiguation code.

At step 144, page generation engine 36 uses the disambiguation code to extract the search origin parameter(s) from the URL. For example, page generation engine 36 may extract a zip code or a city name from the URL. During step 144, page generation engine 36 uses the extracted search origin information and databases 34 such as zip code to location mapping table 98 and place to location mapping 100 to convert the search origin parameter into a corresponding geocode (e.g., a longitude and latitude value).

At step 146, page generation engine 36 identifies relevant products in databases 34. In particular, page generation engine 36 uses search parameters such as product name and product category parameters and databases 34 such as product category table 102 and product list 94 to identify which products match the user's product interests (e.g., which product matches a product name of interest or which products match a product category of interest).

At step 148, page generation engine 36 uses retailer location to product name mapping table 96 to determine which retailers sell the product or products that were identified during step 146. Using retailer location list 92, page generation engine 36 determines which of the retailers that carry the product(s) are located within a given distance (e.g., a default or user-selected search radius) from the search origin. Because these retailers are located in the vicinity of the search origin and therefore are generally located in the vicinity of the user, they are sometimes referred to as local retailers.

At step 150, using retailer location to product name mapping table 96, page generation engine 36 determines regular prices for the product(s) at the local retailers.

At step 152, page generation engine 36 uses promotional pricing table 106 to apply any applicable price adjustments to the regular product prices.

At step 154, the page generation engine 36 assembles relevant search parameters from the user's search to form an embedded URL for subsequent use by advertisement server 42 in targeting promotional material to the user. For example, the page generation engine 36 may create an embedded URL that contains the terms category=refrigerator, search origin=Palo Alto, and product=Maytag XYZ123. The embedded URL may be returned to the user's browser 26 as part of the web page that is produced by the page generation engine.

Search engine web crawlers generally do not use the embedded URL in performing their indexing tasks. However, the user's browser 26 sends the URL parameters such as the product category, product name, and search origin to advertisement server 42 over communications network 18 in the form of the embedded URL (step 158).

At step 160, advertisement server 42 receives the embedded URL from the user's web browser, extracts the embedded search parameters, and uses the extracted parameters in determining which targeted advertisement to display for the user (e.g., as targeted advertisement 52 of FIGS. 2-6). In particular, advertisement server 42 of service 28 applies the targeted advertisement display criteria from targeted advertisement table 108 to the extracted search parameters to determine which targeted advertisement should be provided to the user. A selected targeted advertisement is then returned to the user's browser 26 over communications network 18 for the user to view in conjunction with the web page contents presented by page generation engine 36.

The foregoing is merely illustrative of the principles of this invention and various modifications can be made by those skilled in the art without departing from the scope and spirit of the invention.

What is claimed is:

1. A computer-implemented method for providing online local shopping information to a user with a web browser who is interested in purchasing a product at a brick and mortar retailer, comprising:
   at an online localization service having a database including geocodes for a plurality of retailer addresses, receiving a universal resource locator from the web browser that contains a plurality of search parameters, wherein the search parameters include a search origin that indicates a geographic location and a product name for a product;
   at the localization service, using the search origin and the product name to generate a web page containing a list of retailers in the vicinity of the search origin that carry the product; and
   consulting a plurality of geocoding services over the internet to determine whether the geocodes are accurate with the localization service.

2. The method defined in claim 1 further comprising ordering the retailers on the web page according to their distance from the search origin.

3. The method defined in claim 1 further comprising:
   with an advertisement server, providing a targeted advertisement for the web page.

4. The method defined in claim 1 further comprising:
   with an advertisement server, receiving at least the product name and the search origin; and
   applying targeted advertisement display criteria to at least the product name and the search origin to determine which targeted advertisement to display on the web page.

5. The method defined in claim 1 wherein the localization service comprises a database containing promotional pricing information, the method further comprising:
   displaying product prices on the web page, wherein the product prices reflect promotional pricing adjustments from the promotional pricing information.

6. The method defined in claim 1 further comprising:
   for each listed retailer, displaying a retailer universal resource locator adjacent to the listed retailer on the web page; and
   when a user selects one of the displayed retailer universal resource locators corresponding to a given one of the retailers, generating a store detail web page for the user that contains product information for the product including at least the product name and an address for the given retailer.

7. The method defined in claim 1 further comprising:
   for each listed retailer, displaying a retailer universal resource locator adjacent to the listed retailer on the web page; and
   when a user selects one of the displayed retailer universal resource locators corresponding to a given one of the retailers, generating a store detail web page for the user that contains product information for the product including at least the product name and an address for the given retailer and including a map showing where the given retailer is located.

8. The method defined in claim 1 further comprising:
   for each listed retailer, displaying a retailer universal resource locator adjacent to the listed retailer on the web page; and
   when a user selects one of the displayed retailer universal resource locators corresponding to a given one of the retailers, generating a store detail web page for the user that contains product information for the product including at least the product name, an address for the given retailer, and the price at which the product is sold by the given retailer.

9. The method defined in claim 1 wherein the localization service has a database that includes a retailer location list, and wherein generating the web page comprises generating the web page using the retailer location list.

10. The method defined in claim 1 further comprising:
    with the localization service, receiving a product category from the user; and
    generating a product category web page based on the received product category, wherein the product category web page includes a plurality of product model numbers and a plurality of associated product images.

11. The method defined in claim 1 further comprising:
    with the localization service, receiving a product category from the user; and
    generating a product category web page based on the received product category, wherein the product category web page includes a plurality of product model numbers and a plurality of associated product images and wherein for each product model number the product category web page includes a lowest price for that product model number that is available in the vicinity of the search origin.

12. The method defined in claim 1 further comprising:
    at the localization service, determining which of the retailers that carry the product are within the vicinity of the search origin using a search radius.

13. The method defined in claim 1 wherein the localization service has databases and a page generation engine, the method further comprising:
    with the page generation engine, dynamically generating web pages for the user based on information in the databases.

14. The method defined in claim 1 wherein the localization service has databases and a page generation engine and wherein the databases include product prices for the product at each of the retailers, the method further comprising:
    with the page generation engine, dynamically generating web pages for the user that contain the product prices based on information in the databases.

15. The method defined in claim 1 further comprising providing the universal resource locator to the localization service in response to selection of the universal resource locator from a search engine search results list viewed by the user on the web browser.

16. The method defined in claim 1 wherein the localization service comprises databases, a promotional console, a page generation engine, a data acquisition engine, a data enrichment engine, a query engine, and an advertisement server, the method further comprising:
    with the page generation engine, dynamically generating web pages for the user based on information in the databases;
    with the promotional console, receiving promotional information from retailers over the internet and storing the received promotional information in the databases;
    with the data acquisition engine, acquiring data on prices for products sold by retailers;
    with the data enrichment engine, cleansing the acquired data;
    with the query engine, responding to searches from users for local retailers that sell particular products; and
    with the advertisement server, providing targeted advertisements to the user on the web page containing the list of retailers.

17. The method defined in claim 1 wherein the search origin is received by the localization service in the form of a city name, the method further comprising using a retail location to product name mapping table at the localization service to determine prices for the product at the retailers in the vicinity of the search origin.

18. The method defined in claim 1 wherein receiving the universal resource locator comprises receiving a universal resource locator that contains multiple product attributes.

19. The method defined in claim 1 wherein the localization service comprises a targeted advertisement table containing targeted advertisements and associated display criteria, the method further comprising:

with the advertisement server, applying location-based display criteria from the targeted advertisement table to the search parameters from the universal resource locator to determine which targeted advertisements to display for the user on the web page that contains the list of retailers.

20. A system for providing online local shopping information to a user with a web browser who is interested in purchasing a product at a brick and mortar retailer, comprising:

a database including geocodes for a plurality of retailer addresses;

a query engine to receive a universal resource locator from the web browser that contains a plurality of search parameters, wherein the search parameters include a search origin that indicates a geographic location and a product name for a product;

a page generation engine to generate a web page using the search origin and the product name, the web page containing a list of retailers in the vicinity of the search origin that carry the product; and a geocoding engine to consult a plurality of geocoding services over the internet to determine whether the geocodes are accurate.

\* \* \* \* \*